United States Patent
Peng

(10) Patent No.: US 8,610,666 B2
(45) Date of Patent: Dec. 17, 2013

(54) WHEEL MODULE FOR INPUT DEVICE

(75) Inventor: Chun-Ching Peng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 192 days.

(21) Appl. No.: 13/241,971

(22) Filed: Sep. 23, 2011

(65) Prior Publication Data

US 2013/0027306 A1   Jan. 31, 2013

(30) Foreign Application Priority Data

Jul. 29, 2011   (TW) .............................. 100126975 A

(51) Int. Cl.
*G06F 3/033*   (2013.01)
*G09G 5/08*   (2006.01)

(52) U.S. Cl.
USPC ........................................................ 345/163

(58) Field of Classification Search
USPC ............................ 345/156–169; 200/175–176
See application file for complete search history.

(56) References Cited

U.S. PATENT DOCUMENTS

| | | | |
|---|---|---|---|
| 2007/0159462 A1* | 7/2007 | Yen et al. | 345/163 |
| 2008/0117169 A1* | 5/2008 | Chiang | 345/163 |
| 2009/0195519 A1* | 8/2009 | Chou | 345/184 |

* cited by examiner

*Primary Examiner* — Bipin Shalwala
*Assistant Examiner* — Hang Lin
(74) *Attorney, Agent, or Firm* — Kirton McConkie; Evan R. Witt

(57) ABSTRACT

A wheel module for an input device includes a circuit board, a wheel swinging member, a wheel and a stopping arm. A plurality of switch elements are installed on the circuit board. These switch elements are arranged between the circuit board and the wheel swinging member. The wheel is disposed on the wheel swinging member. When the contact part of the stopping arm is moved to a specified position, the wheel is non-rotatable. By titling the wheel in a specified direction, the wheel swinging member is swung to trigger the switch element corresponding to the specified direction.

10 Claims, 11 Drawing Sheets

WHEEL MODULE FOR INPUT DEVICE

FIELD OF THE INVENTION

The present invention relates to a wheel module, and more particularly to a wheel module for an input device.

BACKGROUND OF THE INVENTION

With increasing development of scientific technologies, multimedia products and computers become essential in our daily lives. In the computer systems, peripheral input devices play important roles for communicating the computer systems and the users. The common peripheral input devices of the computer systems include for example mice, keyboards, microphones, or the like. When a mouse is held on the palm of a user's hand, the user may move the mouse to control movement of the cursor shown on the computer screen. As the cursor is moved, the motion trajectory of the mouse cursor is shown on the computer screen. Since mice are very easy-to-use and can comply with the usual practices of most users, mice are the most prevailing among these peripheral input devices.

Generally, during a document file or a web page is browsed by a user, if the document file or the web page is too large, the image frame shown on the computer screen need to be scrolled in a vertical direction and a horizontal direction, so that the whole contents can be browsed by the user. Since the wheel of a conventional mouse device permits for single axial rotation, the image frame shown on the computer screen can only be vertically scrolled. For performing the horizontal scrolling operation, the left click button of the mouse should be continuously pressed down while the mouse is moved in the horizontal direction. Since the single axial rotation of the mouse is unsatisfactory for the user to browse the document file or the web page, a tilt wheel mouse is developed for controlling horizontal scroll movement of the image shown on the computer screen.

FIG. 1 is a schematic perspective view illustrating the outward appearance of a conventional wheel mouse. As shown in FIG. 1, the tilt wheel mouse 1 comprises a casing 10 and a wheel 11. The casing 10 has an opening 101. Through the opening 101, the wheel 11 is protruded from an outer surface of the casing 10, so that the wheel 11 can be manipulated by a user. By rotating the wheel 11 forwardly (in the direction D1) or backwardly (in the direction D2), the tilt wheel mouse 1 generates a first control signal. According to the first control signal, the computer executes a first command of vertically scrolling the image frame shown on the computer screen for example. By tilting the wheel 11 toward the left side (in the direction D3) or the right side (in the direction D4), the tilt wheel mouse 1 generates a second control signal. According to the second control signal, the computer executes a second command of horizontally scrolling the image frame shown on the computer screen for example.

Although the wheel 11 of the conventional tilt wheel mouse can be rotated forwardly (in the direction D1) or backwardly (in the direction D2) and tilted toward the left side (in the direction D3) or the right side (in the direction D4), there are still some drawbacks. For example, during the wheel 11 is tilted toward the left side or the right side by the user's finger, the wheel 11 may be simultaneously rotated forwardly or backwardly because the depressing force resulting from the user's finger is improperly exerted on the wheel 11. Under this circumstance, the first control signal and the second control signal are accommodated by the computer at the same time. Since the computer fails to judge which command should be executed, the tilt wheel mouse 1 is readily suffered from an erroneous operation. This erroneous operation may bring about considerable trouble to the user.

Nowadays, as the professional computer software becomes more and more diverse, its functionality is increased but the operations of the software are more complicated. Since the wheel of the conventional tilt wheel mouse is permitted to be rotated forwardly and backwardly or tilted toward the left side and the right side, the functions provided by the conventional tilt wheel mouse fail to meet the requirements of most users. Therefore, the conventional tilt wheel mouse needs to be further improved.

SUMMARY OF THE INVENTION

The present invention relates to a wheel module for an input device, and more particularly to a wheel module with a joystick function.

In accordance with an aspect of the present invention, there is provided a wheel module for an input device. The wheel module includes a circuit board, a wheel swinging member, a wheel and a stopping arm. At least one switch element is installed on the circuit board. The wheel swinging member is disposed over the circuit board, so that the at least one switch element is arranged between the circuit board and the wheel swinging member. The wheel is disposed on the wheel swinging member and rotatable relative to the wheel swinging member, wherein a plurality of bumps are formed on a sidewall of the wheel and located around a center of the sidewall. The stopping arm includes a contacting part with a notch and a poking part. When the poking part is moved to allow one of the bumps to be contacted with the contacting part and accommodated within the notch, the wheel is non-rotatable. By titling the wheel in a specified direction, the wheel swinging member is swung relative to the circuit board to trigger the at least one switch element.

In an embodiment, the at least one switch element includes a first switch element, a second switch element, a third switch element and a fourth switch element, which are respectively located at a front side, a rear side, a left side and a right side of the circuit board. A first triggering part, a second triggering part, a third triggering part and a fourth triggering part are disposed on a bottom surface of the wheel swinging member at positions corresponding to the first switch element, the second switch element, the third switch element and the fourth switch element, respectively.

In an embodiment, the wheel module further includes at least one elastic member, which is arranged between the wheel swinging member and the circuit board for providing an elastic force to the wheel swinging member.

In an embodiment, the elastic member is made of a rubbery material.

In an embodiment, the at least one switch element is a resistive pressure sensor or a capacitive pressure sensor.

In an embodiment, the input device has a casing, and an adjusting hole is located at a bottom surface of the casing, wherein an end of the poking part is penetrated through the adjusting hole, so that the end of the poking part is exposed outside the casing.

In an embodiment, an opening is formed in a top surface of the casing, wherein the wheel is partially exposed outside the casing through the opening.

In an embodiment, the stopping arm further includes a linking part, which is arranged between the contacting part and the poking part. As the poking part is moved, the contacting part is synchronously moved with the poking part through the linking part.

In an embodiment, when the poking part is moved to a specified position of the adjusting hole, the wheel is non-rotatable.

In an embodiment, the input device is a mouse device, a keyboard device or a mobile communication device.

In accordance with another aspect of the present invention, there is provided a wheel module for an input device. The wheel module includes a circuit board, a wheel swinging member, a wheel and a stopping arm. At least one switch element is installed on the circuit board. The wheel swinging member is disposed over the circuit board, so that the at least one switch element is arranged between the circuit board and the wheel swinging member. The wheel is disposed on the wheel swinging member and rotatable relative to the wheel swinging member. The wheel has a vacant structure, and a plurality of indentations are formed in an inner surface of the vacant structure. The stopping arm includes a contacting part and a poking part. When the poking part is moved to allow the contacting part to be accommodated within one of the indentations, the wheel is non-rotatable. By titling the wheel in a specified direction, the wheel swinging member is swung relative to the circuit board to trigger the at least one switch element.

In an embodiment, the at least one switch element includes a first switch element, a second switch element, a third switch element and a fourth switch element, which are respectively located at a front side, a rear side, a left side and a right side of the circuit board. A first triggering part, a second triggering part, a third triggering part and a fourth triggering part are disposed on a bottom surface of the wheel swinging member at positions corresponding to the first switch element, the second switch element, the third switch element and the fourth switch element, respectively.

In an embodiment, the wheel module further includes at least one elastic member, which is arranged between the wheel swinging member and the circuit board for providing an elastic force to the wheel swinging member.

In an embodiment, the elastic member is made of a rubbery material.

In an embodiment, the at least one switch element is a resistive pressure sensor or a capacitive pressure sensor.

In an embodiment, the input device has a casing, and an adjusting hole is located at a bottom surface of the casing, wherein an end of the poking part is penetrated through the adjusting hole, so that the end of the poking part is exposed outside the casing.

In an embodiment, an opening is formed in a top surface of the casing, wherein the wheel is partially exposed outside the casing through the opening.

In an embodiment, the stopping arm further includes a linking part, which is arranged between the contacting part and the poking part. As the poking part is moved, the contacting part is synchronously moved with the poking part through the linking part.

In an embodiment, when the poking part is moved to a specified position of the adjusting hole, the wheel is non-rotatable.

In an embodiment, the vacant structure is a hollow groove or a recess.

In an embodiment, the input device is a mouse device, a keyboard device or a mobile communication device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a wheel module. By operating the wheel module, a corresponding electronic device can be controlled. The wheel module may be installed in various input devices such as mouse devices, keyboard devices, mobile phones or personal digital assistants (PDA). The applications of the wheel module are not restricted to these input devices.

Figure 1:
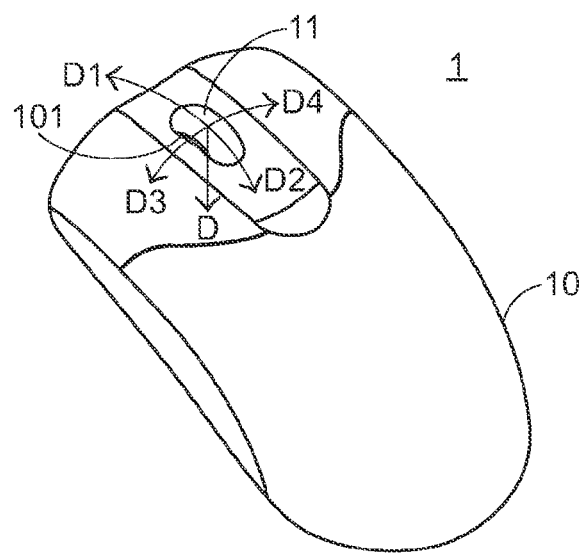
FIG. 1 is a schematic perspective view illustrating the outward appearance of a conventional wheel mouse.
Figure 2:
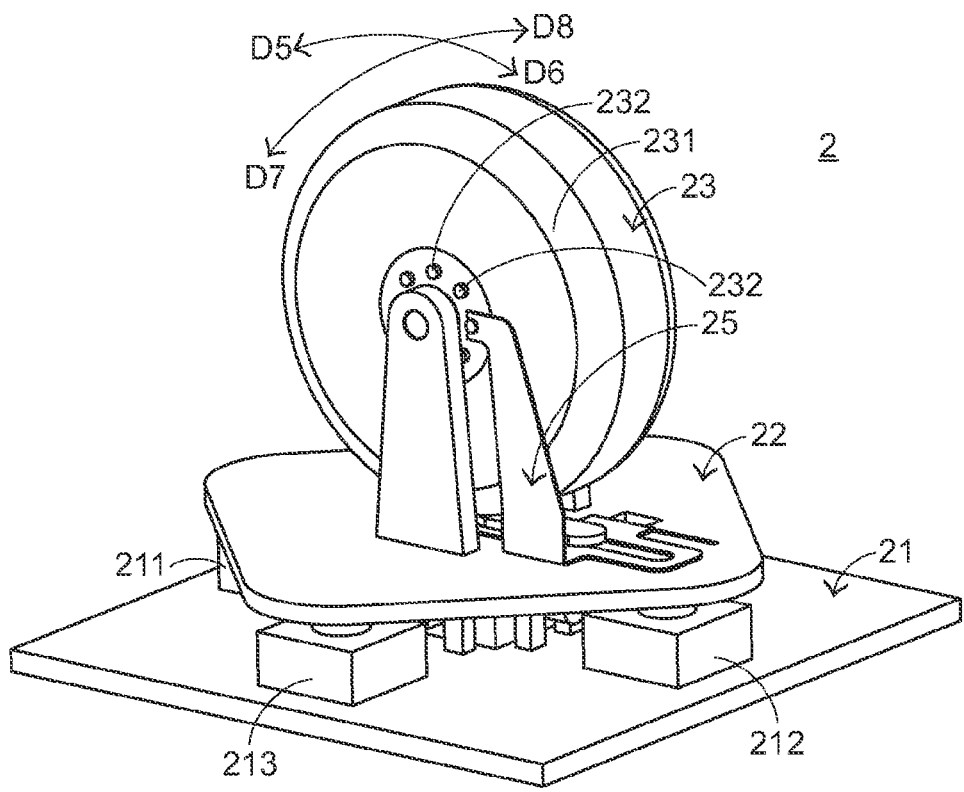
FIG. 2 is a schematic perspective view illustrating a wheel module for an input device according to a first embodiment of the present invention.
Figure 3:
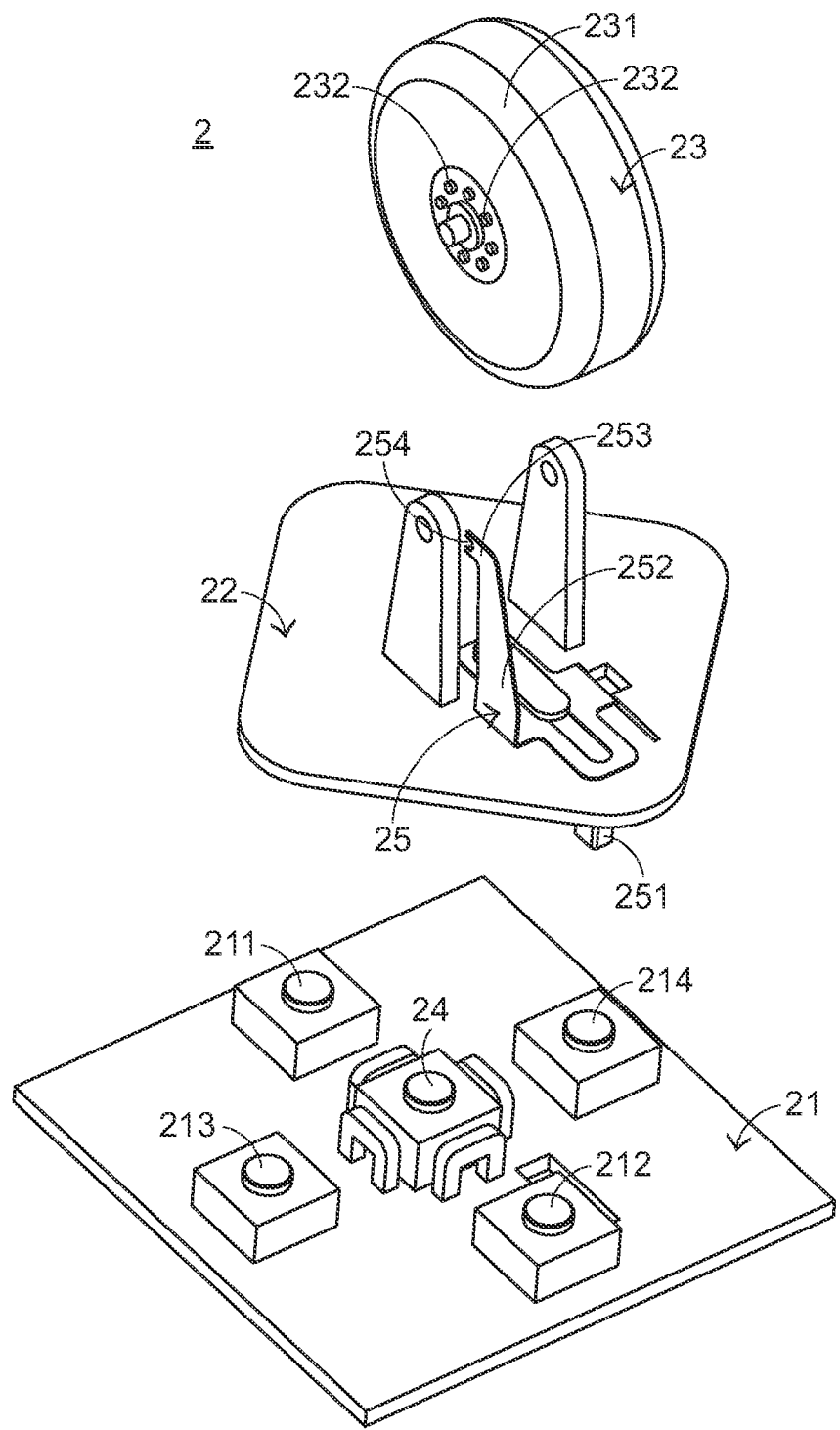
FIG. 3 is a schematic three-dimensional exploded view illustrating the wheel module as shown in FIG. 2.
Figure 4:
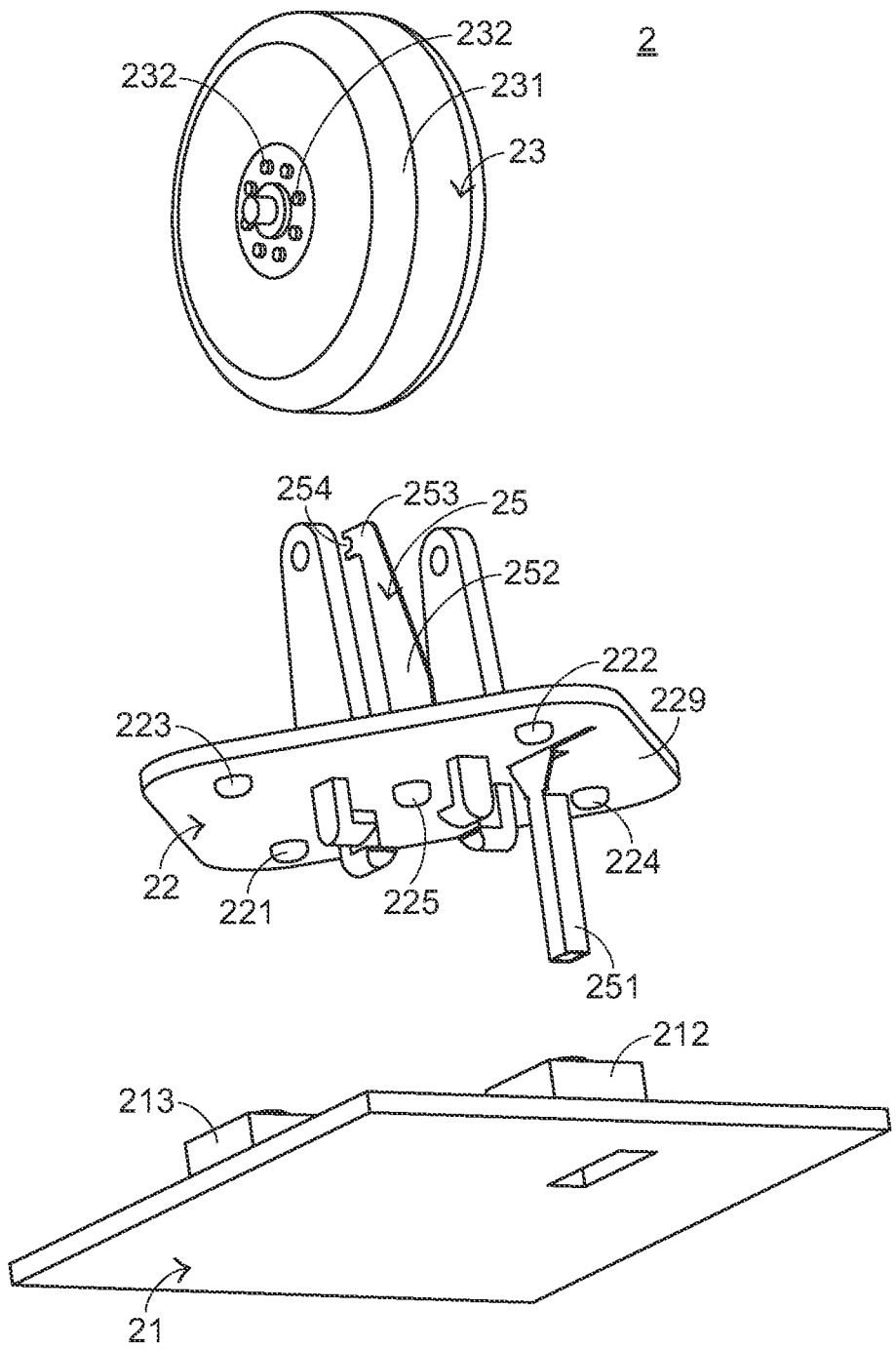
FIG. 4 is a schematic three-dimensional exploded view illustrating the wheel module as shown in FIG. 2 and taken along another viewpoint.

FIG. 2 is a schematic perspective view illustrating a wheel module for an input device according to a first embodiment of the present invention. FIG. 3 is a schematic three-dimensional exploded view illustrating the wheel module as shown in FIG. 2. FIG. 4 is a schematic three-dimensional exploded view illustrating the wheel module as shown in FIG. 2 and taken along another viewpoint. Please refer to FIGS. 2, 3 and 4. The wheel module 2 comprises a circuit board 21, a wheel swinging member 22, a wheel 23, an elastic member 24 and a stopping arm 25. The wheel swinging member 22 is disposed on the circuit board 21. The wheel 23 is disposed on the wheel swinging member 22. The elastic member 24 is in contact with the wheel swinging member 22. Moreover, at least one switch element 211~214 is installed on the circuit board 21, and arranged between the circuit board 21 and the wheel swinging member 22. The wheel 23 is rotatable relative to the wheel swinging member 22.

In a case that the wheel 23 is moved by a user's finger to be tilted in a specified direction, the wheel swinging member 22 is synchronously swung relative to the circuit board 21, so that the at least one switch element 211~214 is triggered by the wheel swinging member 22. In a case that the wheel 23 is no longer moved by the user's finger, the elastic force resulting from the elastic member 24 causes the wheel swinging member 22 to be returned to its original position. Moreover, according to the rotating distance of the wheel 23, the rotating speed of the wheel 23 or the triggering status of any switch element 211~214, a corresponding control signal is outputted from the input device (not shown) to an electronic device (not shown), which is in communication with the input device. The electronic device is for example a computer. According to the control signal, the electronic device executes a corresponding command.

In the first embodiment, a first switch element 211, a second switch element 212, a third switch element 213 and a fourth switch element 214 are located at a front side, a rear side, a left side and a right side of the circuit board 21, respectively. Moreover, a first triggering part 221, a second triggering part 222, a third triggering part 223 and a fourth triggering part 224 are disposed on a bottom surface 229 of the wheel swinging member 22 at the positions corresponding to the first switch element 211, the second switch element 212, the third switch element 213 and the fourth switch element 214, respectively. In a case that the wheel 23 is moved by the user's finger to be tilted in a direction D5, the wheel swinging member 22 is synchronously swung relative to the circuit board 21 in the direction D5, and thus the first switch element 211 is triggered by the first triggering part 221. In a case that the wheel 23 is moved by the user's finger to be tilted in a direction D6, the wheel swinging member 22 is synchronously swung relative to the circuit board 21 in the direction D6, and thus the second switch element 212 is triggered by the second triggering part 222. In a case that the wheel 23 is moved by the user's finger to be tilted in a direction D7, the wheel swinging member 22 is synchronously swung relative to the circuit board 21 in the direction D7, and thus the third switch element 213 is triggered by the third triggering part 223. In a case that the wheel 23 is moved by the user's finger to be tilted in a direction D8, the wheel swinging member 22 is synchronously swung relative to the circuit board 21 in the direction D8, and thus the fourth switch element 214 is triggered by the fourth triggering part 224.

Moreover, in the first embodiment, the elastic member 24 is a push switch element with a rubbery shell. The elastic member 24 is installed on the circuit board 21, and located at a central position relative to the first switch element 211, the second switch element 212, the third switch element 213 and the fourth switch element 214. Moreover, the push switch element is located at a level higher than each of the first switch element 211, the second switch element 212, the third switch element 213 and the fourth switch element 214. In addition, a push triggering part 225 is disposed on the bottom surface 229 of the wheel swinging member 22 and in contact with the elastic member 24. In a case that the wheel 23 is pressed down by the user to be moved downwardly, the wheel swinging member 22 is synchronously moved downwardly, and thus the push switch element is triggered by the push triggering part 225. Moreover, regardless of whether the wheel 23 is tilted in any direction or moved downwardly, when the force exerted on the wheel 23 is eliminated, the elastic member 24 provides an elastic force to the wheel swinging member 22 because the external shell of the push switch element is made of a rubbery material. Due to the elastic force, the wheel swinging member 22 is restored to the non-swinging state.

In the first embodiment, a plurality of bumps 232 are formed on a sidewall 231 of the wheel 23 of the wheel module 2 and located around a center of the sidewall 231. The stopping arm 25 of the wheel module 2 comprises a poking part 251, a linking part 252 and a contacting part 253. The contacting part 253 has a notch 254. The linking part 252 is arranged between the contacting part 253 and the poking part 251. As the poking part 251 is moved, the contacting part 253 is synchronously moved with the poking part 251 through the linking part 252. The poking part 251 may be manually moved. Alternatively, the movement of the poking part 251 may be driven by a mechanism that is coupled with the poking part 251. Such a mechanism is for example a motor, an electromagnet or a voice coil.

Figure 5A:
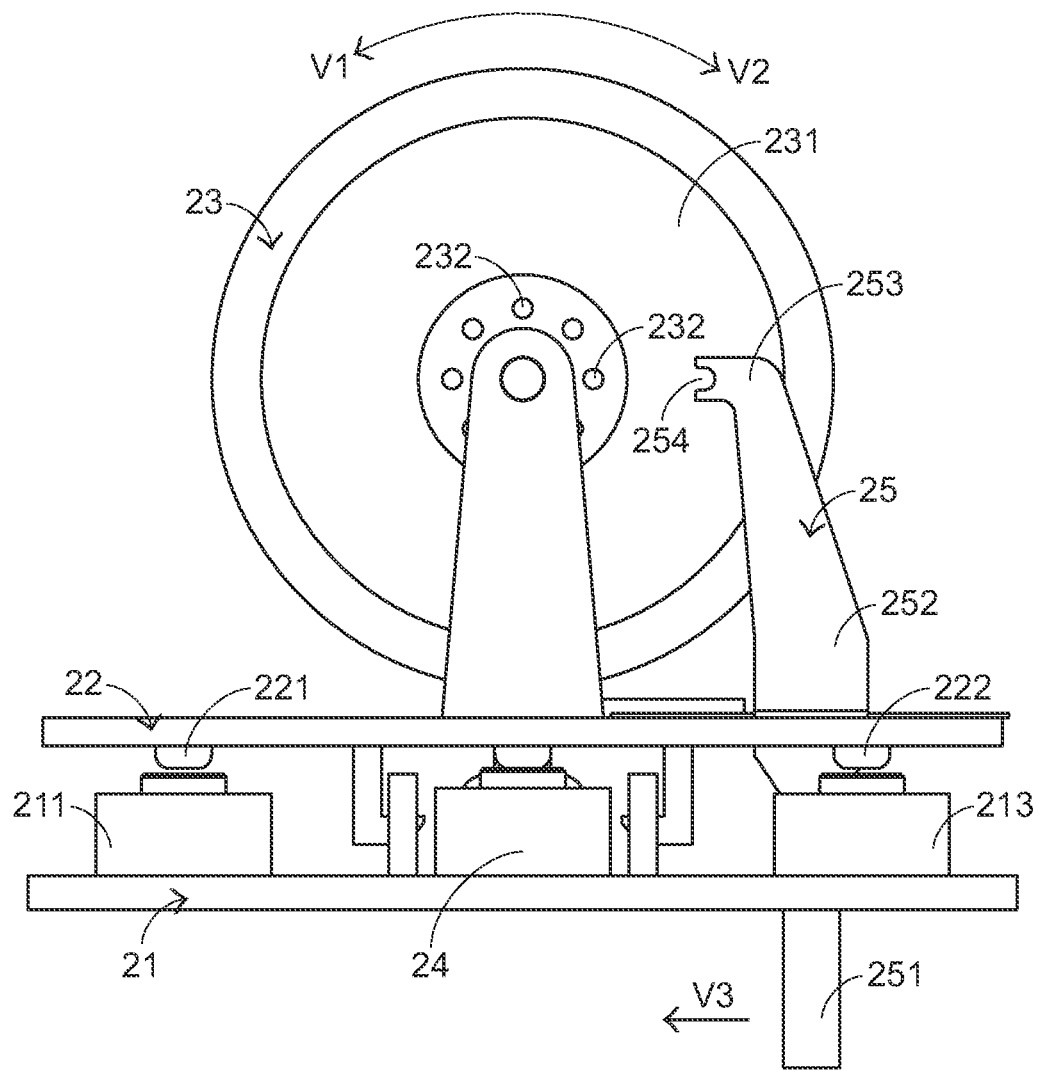
FIG. 5A schematically illustrates the wheel module of FIG. 2, in which the wheel is operated in a rotating mode.
Figure 5B:
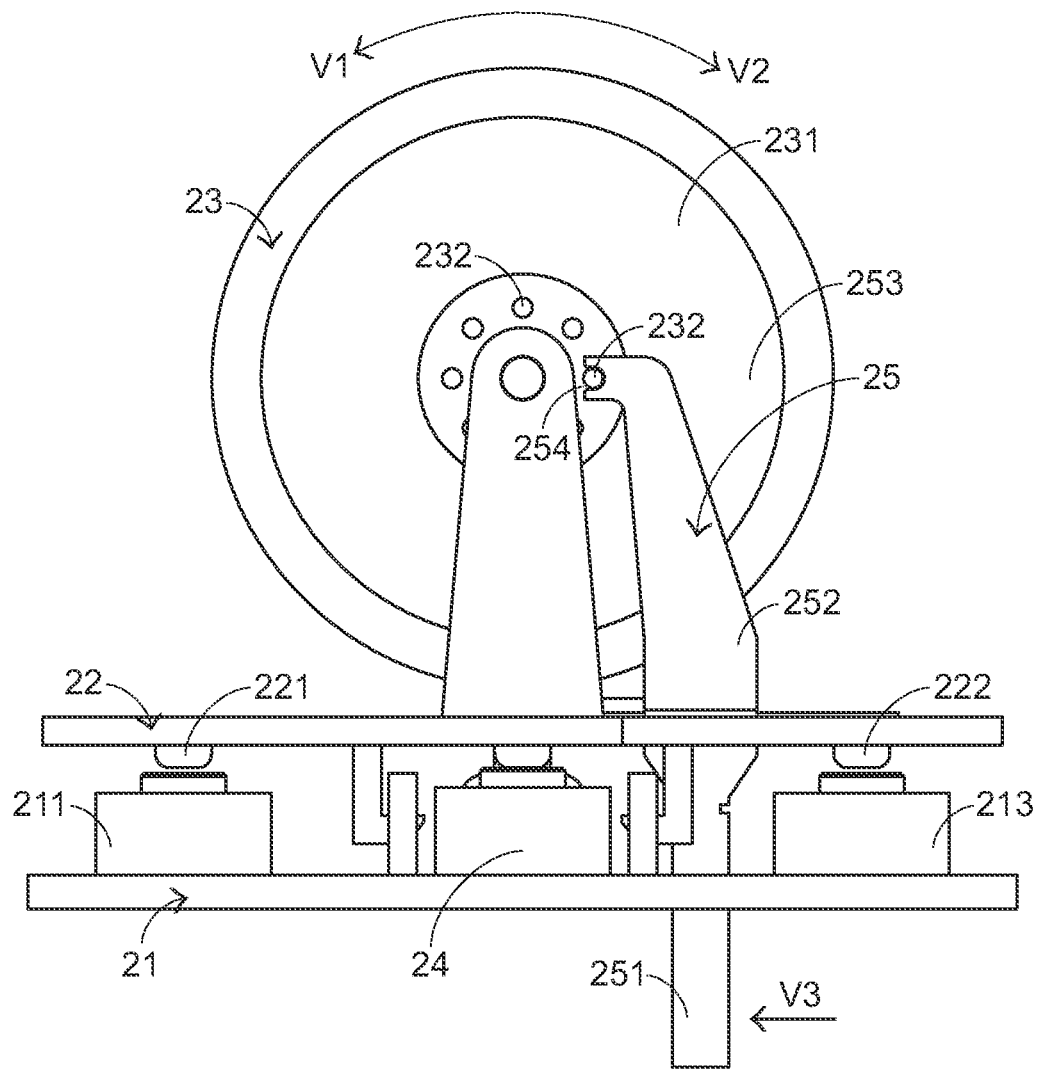
FIG. 5B schematically illustrates the wheel module of FIG. 2, in which the wheel is operated in a swinging mode.

FIG. 5A schematically illustrates the wheel module of FIG. 2, in which the wheel is operated in a rotating mode. As shown in FIG. 5A, the contacting part 253 of the stopping arm 25 is separated from any bump 232 at the sidewall 231 of the wheel 23, so that the wheel 23 is rotatable relative to the wheel swinging member 22 in a rotating direction V1 or a rotating direction V2. FIG. 5B schematically illustrates the wheel module of FIG. 2, in which the wheel is operated in a swinging mode. As shown in FIG. 5B, the poking part 251 of the stopping arm 25 is moved in a direction V3, so that the contacting part 253 is contacted with one of the bumps 232 at the sidewall 231 of the wheel 23. When the corresponding bump 232 is accommodated within the notch 254 of the contacting part 253, the wheel 23 fails to be rotated relative to the wheel swinging member 22 in the rotating direction V1 and the rotating direction V2. Meanwhile, the user may exert a force on the wheel 23 to tilt the wheel 23 in one of the directions D5, D6, D7 and D8 or move the wheel 23 downwardly. Even if the force is improperly exerted on the wheel 23, the wheel 23 is not synchronously rotated in the rotating direction V1 or the rotating direction V2. Under this circumstance, the rotation of the wheel 23 and the swinging action or downward motion of the swing 23 do not occur simultaneously. As a consequence, the electronic device in communication with the input device will not simultaneously receive two or more control signals. Since the electronic device can judge which command should be executed, the possibility of resulting in the erroneous operation will be minimized.

Figure 6:
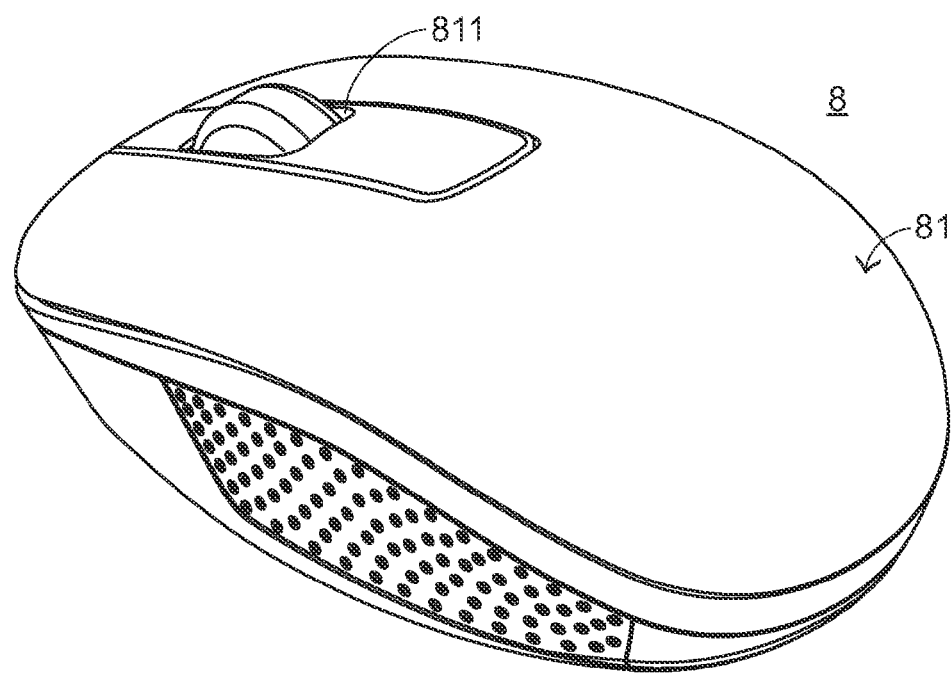
FIG. 6 is a schematic perspective view illustrating a mouse device having the wheel module according to the first embodiment of the present invention.
Figure 7:
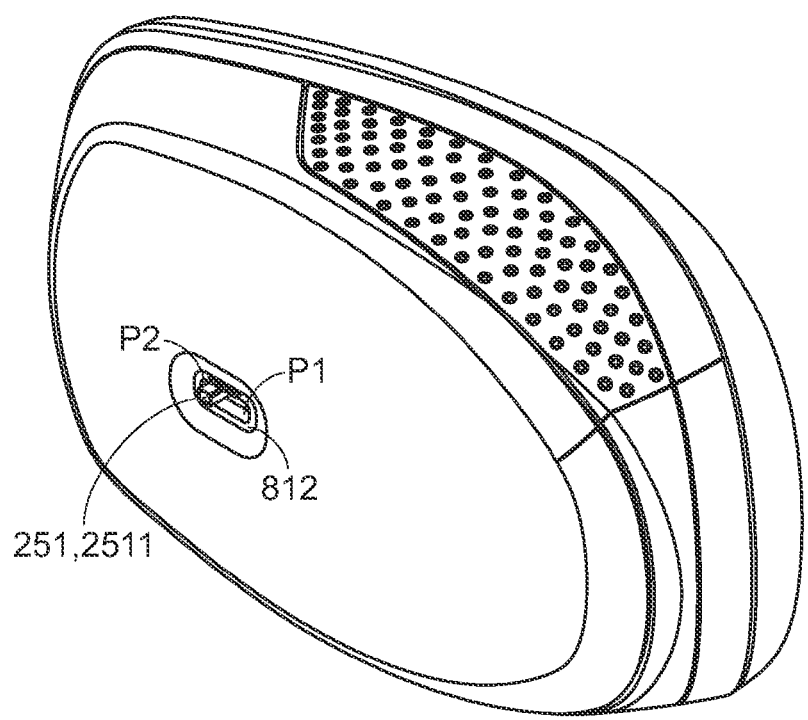
FIG. 7 is a schematic perspective view illustrating the mouse device of FIG. 6 and taken along another viewpoint.
Figure 8:
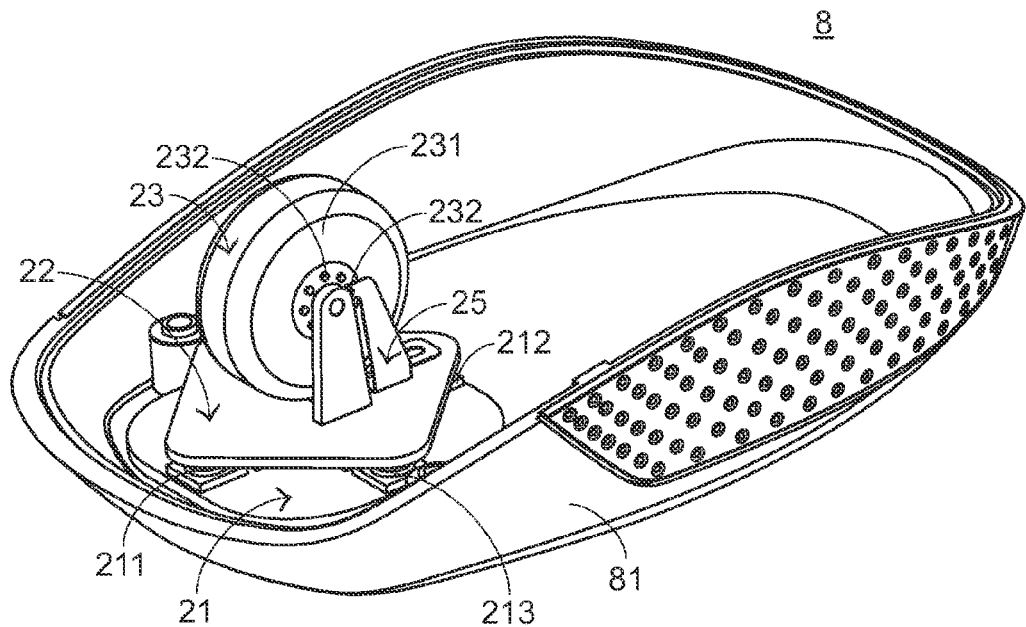
FIG. 8 is a schematic perspective view illustrating the internal portion of the mouse device as shown in FIG. 6.

FIG. 6 is a schematic perspective view illustrating a mouse device having the wheel module according to the first embodiment of the present invention. FIG. 7 is a schematic perspective view illustrating the mouse device of FIG. 6 and taken along another viewpoint. FIG. 8 is a schematic perspective view illustrating the internal portion of the mouse device as shown in FIG. 6. Please refer to FIGS. 6, 7 and 8. The mouse device 8 has a casing 81. When the casing 81 is held on the palm of a user's hand, the user may move the mouse device. In addition, an opening 811 is formed in a top surface of the casing 81. Through the opening 811, the wheel 23 of the wheel module 2 is partially exposed outside the casing 81. Consequently, the wheel 23 exposed outside the casing 81 can be manipulated by the user's finger.

Moreover, an adjusting hole 812 is located at the bottom surface of the casing 81. A first end 2511 of the poking part 251 of the stopping arm 25 of the wheel module 2 is penetrated through the adjusting hole 812, so that the first end 2511 of the poking part 251 is exposed outside the casing 81. In such way, since the first end 2511 of the poking part 251 may be moved to a specified position by the user, the wheel 23 can be selectively rotated or not.

For example, in a case that the first end 2511 of the poking part 251 is moved to a first position P1 of the adjusting hole 812, the contacting part 253 of the stopping arm 25 is separated from any bump 232 at the sidewall 231 of the wheel 23, and thus the wheel 23 is rotatable relative to the wheel swinging member 22. Whereas, in a case that the first end 2511 of the poking part 251 is moved to a second position P2 of the adjusting hole 812, the contacting part 253 is contacted with one of the bumps 232 at the sidewall 231 of the wheel 23 and the corresponding bump 232 is accommodated within the notch 254 of the contacting part 253, and thus the wheel 23 fails to be rotated relative to the wheel swinging member 22.

It is noted that the applications of the wheel module 2 in the above embodiments of this invention are presented herein for purpose of illustration and description only. Those skilled in the art will readily observe that numerous modifications and alterations may be made while retaining the teachings of the invention. For example, the adjusting hole 812 may be located on a sidewall of the casing 81 of the mouse device 8.

By retaining the teachings of the above embodiments, the wheel module of the present invention may be applied in other input devices such as keyboard devices or personal digital assistants (PDA).

Figure 9:
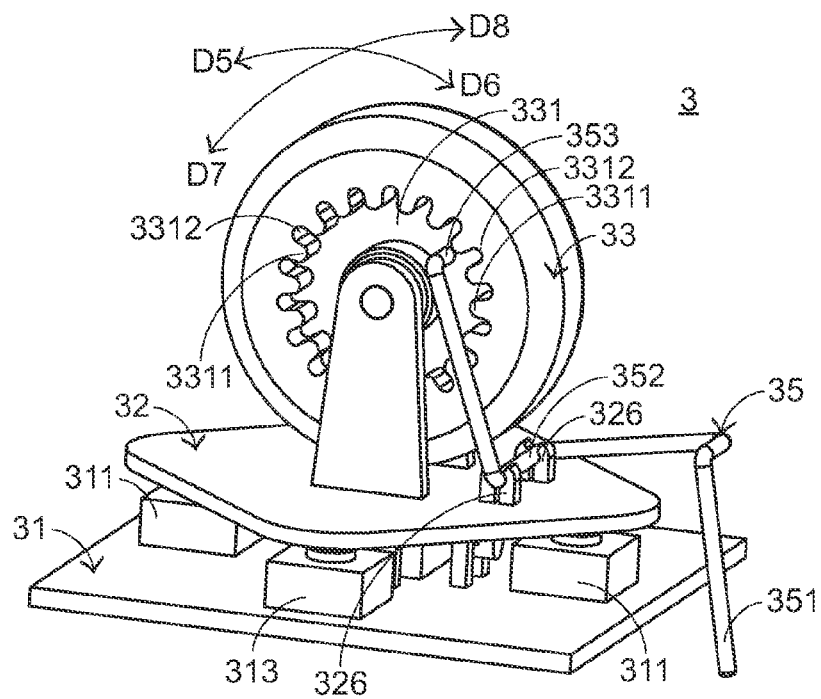
FIG. 9 is a schematic perspective view illustrating a wheel module for an input device according to a second embodiment of the present invention.

FIG. 9 is a schematic perspective view illustrating a wheel module for an input device according to a second embodiment of the present invention. Like the wheel module of the first embodiment, the wheel module 3 of FIG. 9 comprises a circuit board 31, a wheel swinging member 32, a wheel 33, an elastic member 34 and a stopping arm 35. The wheel swinging member 32 is disposed on the circuit board 31. The wheel 33 is disposed on the wheel swinging member 32. The elastic member 34 is in contact with the wheel swinging member 32. In addition, a first switch element 311, a second switch element 312, a third switch element 313 and a fourth switch element are disposed on the circuit board 31. Due to the viewpoint, the fourth switch element is not shown. The components similar to those of the first embodiment are not redundantly described herein.

In comparison with the first embodiment, the wheel 33 of the wheel module 3 has a vacant structure 331. A plurality of indentations 3312 are formed in the inner surface 3311 of the vacant structure 331. An example of the vacant structure 331 includes but is not limit to a recess or a hollow groove. The stopping arm 35 of the wheel module 3 comprises a poking part 351, a linking part 352 and a contacting part 353. The linking part 352 is arranged between the contacting part 353 and the poking part 351. As the poking part 351 is moved, the contacting part 353 is synchronously moved with the poking part 351 through the linking part 352. The poking part 351 may be manually moved. Alternatively, the poking part 351 may be moved by a mechanism that is coupled with the poking part 351. Such a mechanism is for example a motor, an electromagnet or a voice coil.

In the second embodiment, the wheel swinging member 32 further comprises a supporting part 326 for supporting the linking part 352. By using the connecting region between the linking part 352 and the supporting part 326 as a fulcrum, a lever motion of the stopping arm 35 is permitted. The way of allowing the contacting part 353 to be synchronously moved with the poking part 351 is presented herein for purpose of illustration and description only.

Figure 10A:
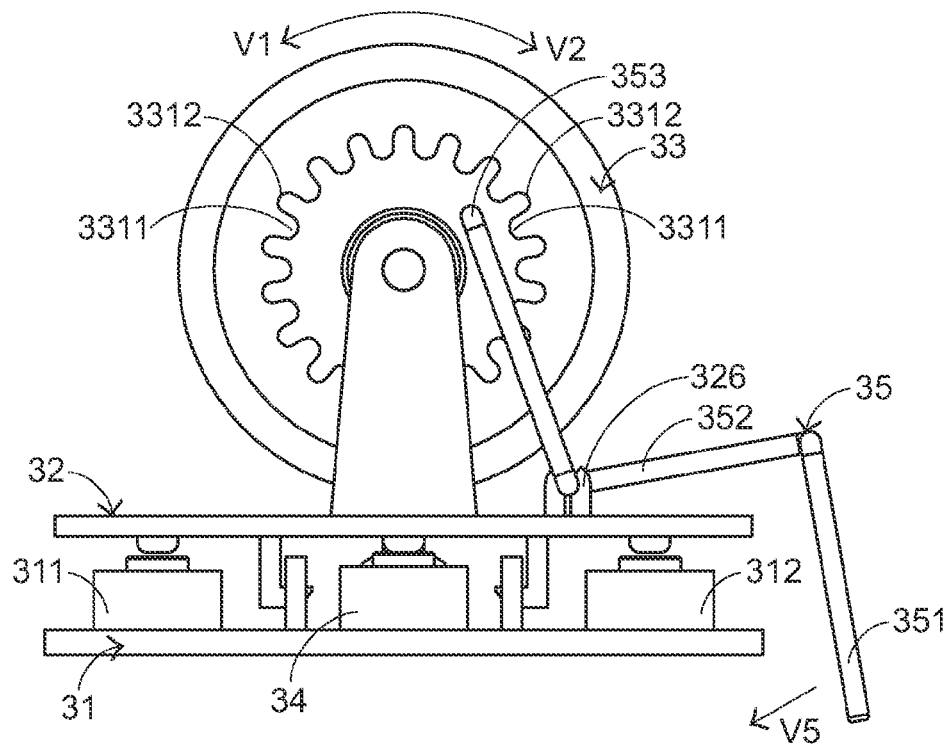
FIG. 10A schematically illustrates the wheel module of FIG. 9, in which the wheel is operated in a rotating mode.
Figure 10B:
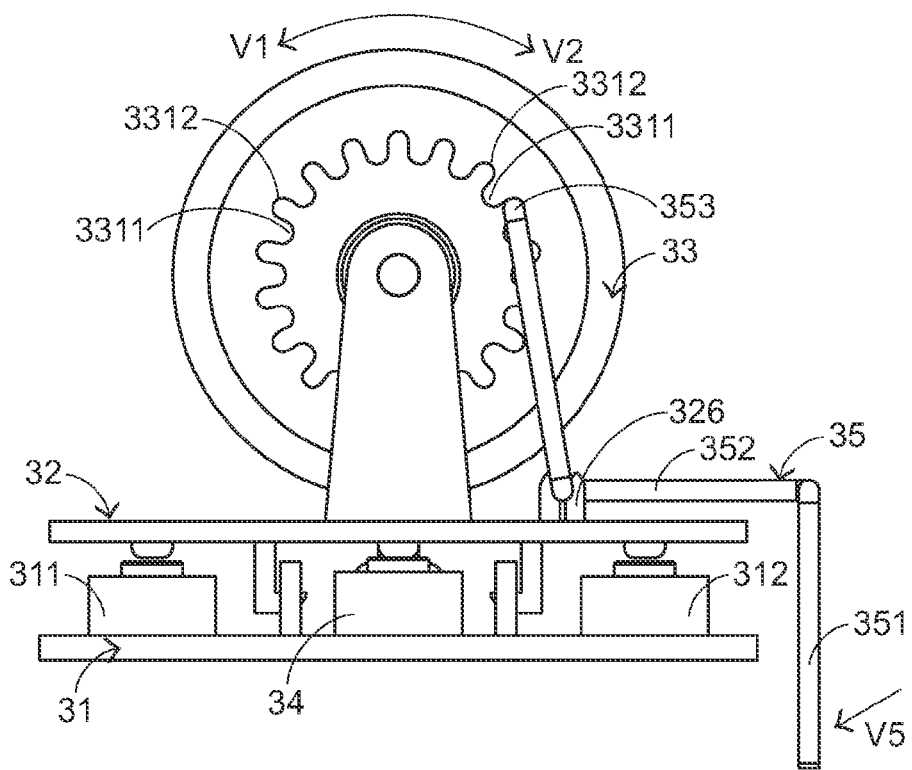
FIG. 10B schematically illustrates the wheel module of FIG. 9, in which the wheel is operated in a swinging mode.

FIG. 10A schematically illustrates the wheel module of FIG. 9, in which the wheel is operated in a rotating mode. As shown in FIG. 10A, the contacting part 353 of the stopping arm 35 is separated from the inner surface 3311, so that the wheel 33 is rotatable relative to the wheel swinging member 32 in a rotating direction V1 or a rotating direction V2. FIG. 10B schematically illustrates the wheel module of FIG. 9, in which the wheel is operated in a swinging mode. As shown in FIG. 10B, the poking part 351 of the stopping arm 35 is moved in a direction V5, so that the contacting part 353 is accommodated within one of the indentations 3312 in the inner surface 3311 of the wheel 33. Consequently, the wheel 33 fails to be rotated relative to the wheel swinging member 32 in the rotating direction V1 and the rotating direction V2. Meanwhile, the user may exert a force on the wheel 33 to tilt the wheel 33 in one of the directions D5, D6, D7 and D8 or move the wheel 33 downwardly. Even if the force is improperly exerted on the wheel 33, the wheel 33 is not synchronously rotated in the rotating direction V1 or the rotating direction V2. Under this circumstance, the rotation of the wheel 33 and the swinging action or downward motion of the swing 33 do not occur simultaneously. As a consequence, the electronic device in communication with the input device will not simultaneously receive two or more control signals. Since the electronic device can judge which command should be executed, the possibility of resulting in the erroneous operation will be minimized.

Figure 11:
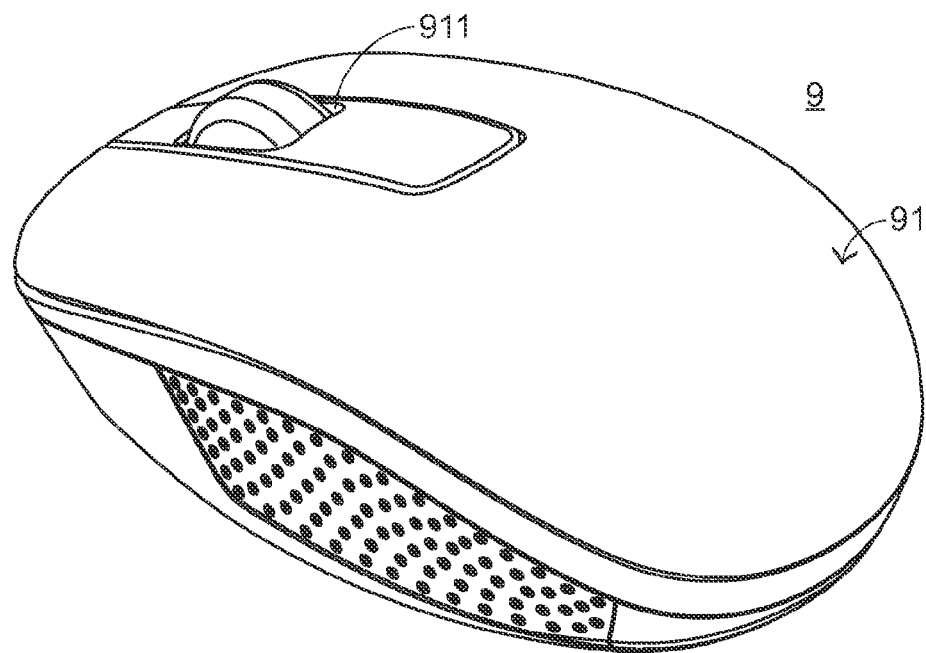
FIG. 11 is a schematic perspective view illustrating a mouse device having the wheel module according to the second embodiment of the present invention.
Figure 12:
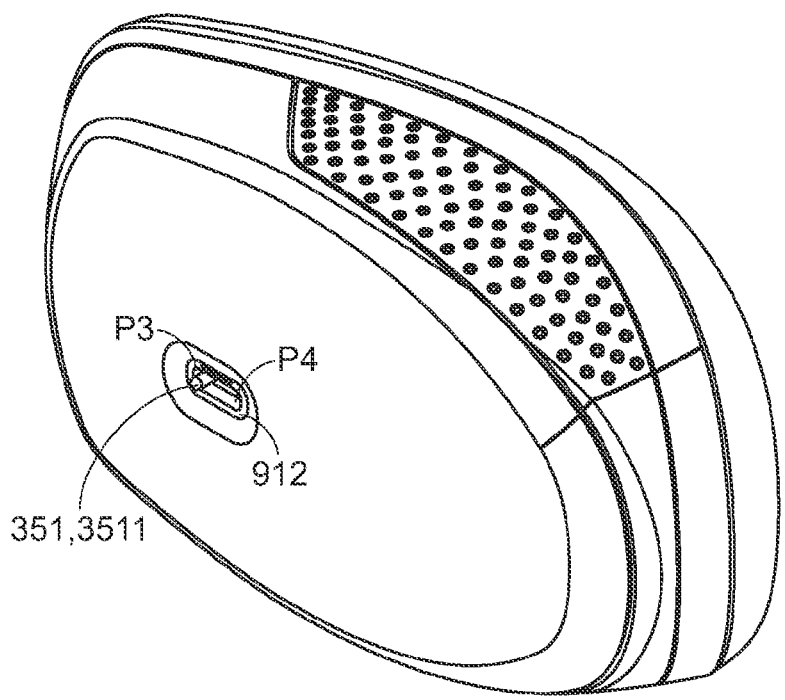
FIG. 12 is a schematic perspective view illustrating the mouse device of FIG. 11 and taken along another viewpoint.
Figure 13:
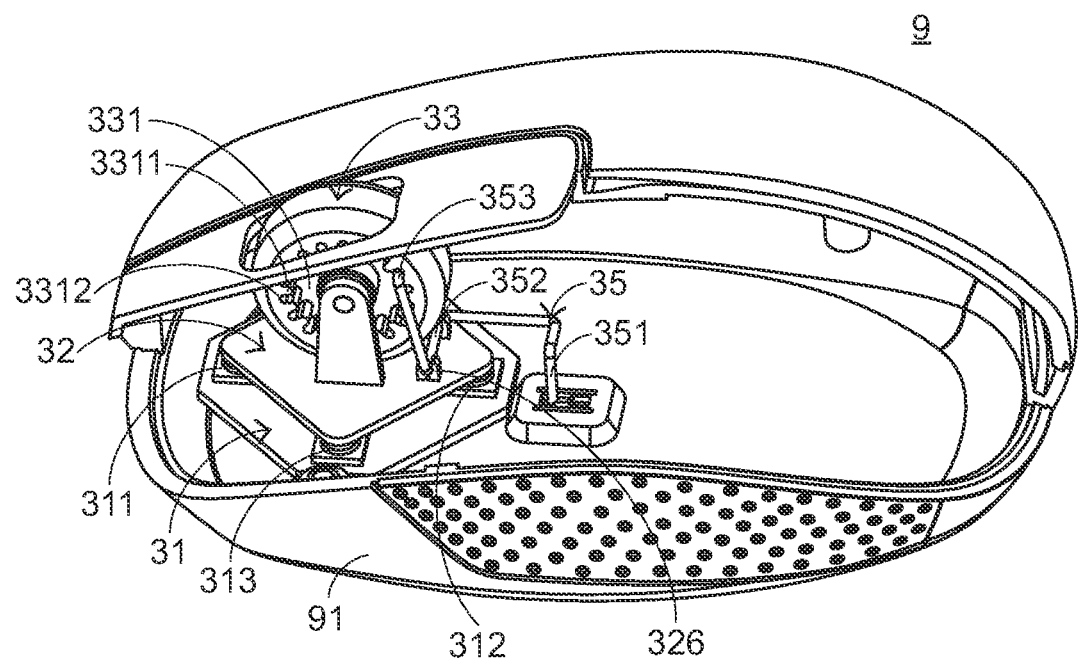
FIG. 13 is a schematic perspective view illustrating the internal portion of the mouse device as shown in FIG. 11.

FIG. 11 is a schematic perspective view illustrating a mouse device having the wheel module according to the second embodiment of the present invention. FIG. 12 is a schematic perspective view illustrating the mouse device of FIG. 11 and taken along another viewpoint. FIG. 13 is a schematic perspective view illustrating the internal portion of the mouse device as shown in FIG. 11. Please refer to FIGS. 11, 12 and 13. The mouse device 9 has a casing 91. When the casing 91 is held on the palm of a user's hand, the user may move the mouse device. In addition, an opening 911 is formed in a top surface of the casing 91. Through the opening 911, the wheel 33 of the wheel module 3 is partially exposed outside the casing 91. Consequently, the wheel 33 exposed outside the casing 91 can be manipulated by the user's finger.

Moreover, an adjusting hole 912 is located at the bottom surface of the casing 91. A first end 3511 of the poking part 351 of the stopping arm 35 of the wheel module 3 is penetrated through the adjusting hole 912, so that the first end 3511 of the poking part 351 is exposed outside the casing 91. In such way, since the first end 3511 of the poking part 351 may be moved to a specified position by the user, the wheel 33 can be selectively rotated or not.

For example, in a case that the first end 3511 of the poking part 351 is moved to a first position P3 of the adjusting hole 912, the contacting part 353 of the stopping arm 35 is separated from the inner surface 3311 of the wheel 33, and thus the wheel 33 is rotatable relative to the wheel swinging member 32. Whereas, in a case that the first end 3511 of the poking part 351 is moved to a second position P4 of the adjusting hole 912, the contacting part 353 is accommodated within one of the indentations 3312 in the inner surface 3311 of the wheel 33, and thus the wheel 33 fails to be rotated relative to the wheel swinging member 32.

It is noted that the applications of the wheel module 3 in the above embodiments of this invention are presented herein for purpose of illustration and description only. Those skilled in the art will readily observe that numerous modifications and alterations may be made while retaining the teachings of the invention. For example, the adjusting hole 912 may be located on a sidewall of the casing 91 of the mouse device 9. By retaining the teachings of the above embodiments, the wheel module of the present invention may be applied in other input devices such as keyboard devices or personal digital assistants (PDA).

The configurations of the wheel module in the above two embodiments are presented herein for purpose of illustration and description only. In the wheel module, the number and the locations of the switch elements, the number and locations of the triggering parts of the wheel swinging member, and the material, number and location of the elastic member may be varied according to the practical requirements. For example, the elastic member used in the wheel module of the first embodiment or the second embodiment may be replaced by a spring.

Figure 14:
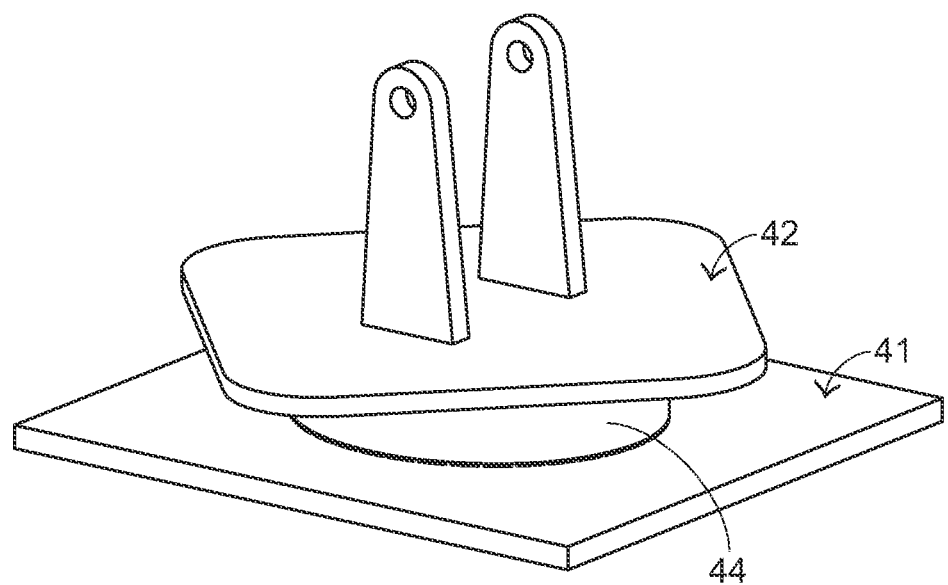
FIG. 14 is a schematic perspective view illustrating the relationship between the circuit board, the elastic member and the wheel swinging member of a wheel module according to another embodiment of the present invention.
Figure 15:
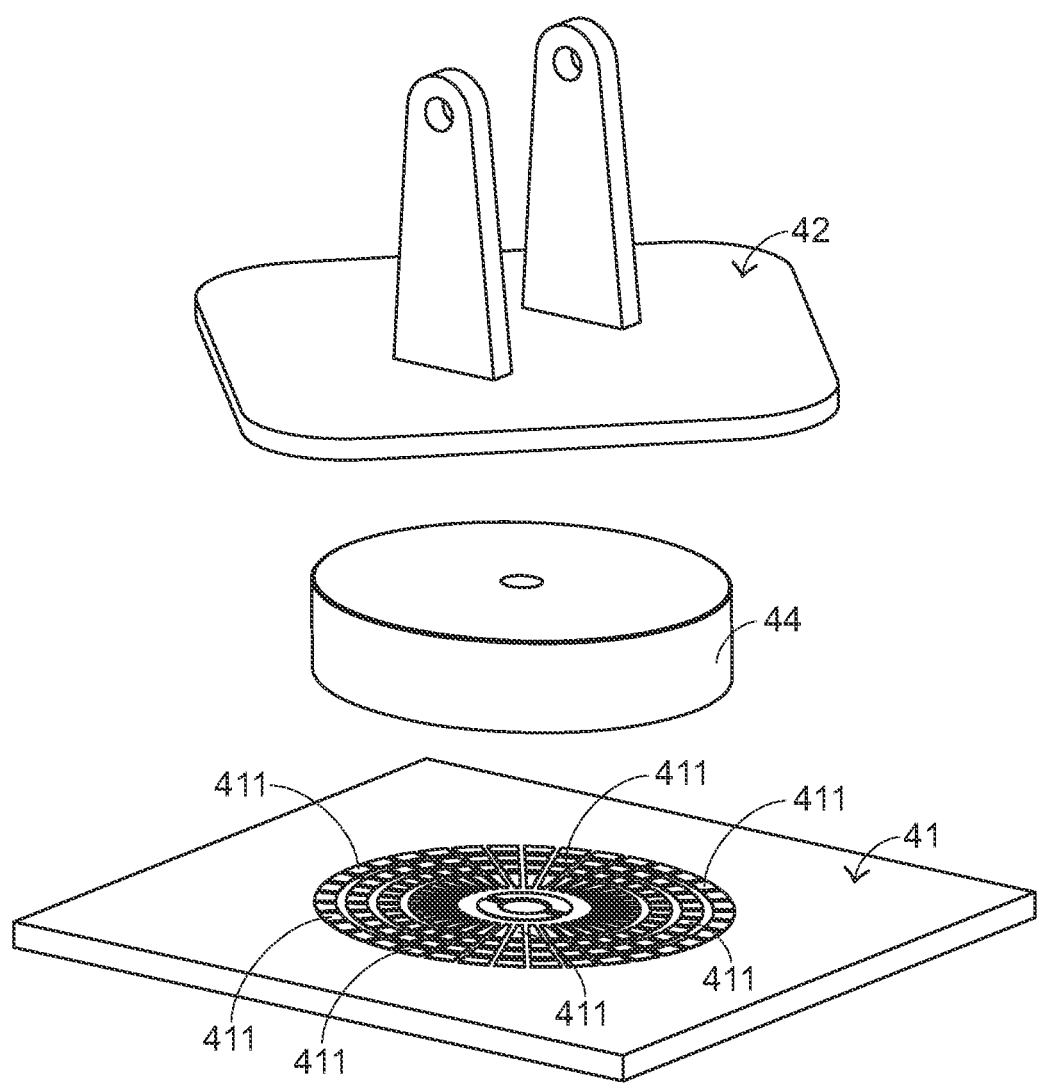
FIG. 15 is a schematic three-dimensional exploded view illustrating the relationship between the circuit board, the elastic member and the wheel swinging member of the wheel module as shown in FIG. 14.

FIG. 14 is a schematic perspective view illustrating the relationship between the circuit board, the elastic member and the wheel swinging member of a wheel module according to another embodiment of the present invention. FIG. 15 is a schematic three-dimensional exploded view illustrating the relationship between the circuit board, the elastic member and the wheel swinging member of the wheel module as shown in FIG. 14. As shown in FIGS. 14 and 15, a plurality of switch elements 411 are disposed on the circuit board 41. These switch elements 411 are uniformly distributed on the circuit board 41 in 360-degree orientations. In addition, the elastic member 44 is arranged between the circuit board 41 and the wheel swinging member 42. Preferably, the switch elements 411 are resistive pressure sensors or capacitive pressure sensors. An example of the elastic member 44 is a conductive rubbery article.

When the wheel (not shown) on the wheel swinging member 42 is moved by the user to allow the wheel swinging member 42 to be swung in a specified direction, the elastic member 44 is compressed to touch a corresponding switch element 411 and trigger the corresponding switch element 411. When the user stops moving the wheel (not shown) on the wheel swinging member 42, the elastic force resulting from the compressed elastic member 44 causes the wheel swinging member 42 to be returned to the original position. Moreover, since the switch elements 411 are uniformly distributed on the circuit board 41 in 360-degree orientations, the control signal generated when the corresponding switch element 411 is triggered may be vector-oriented. In such way, the wheel module of the present invention can provide a joystick function.

From the above description, the wheel module for the input device of the present invention has the following benefits. Firstly, since the wheel of the wheel module can be locked, when the joystick function is used, the wheel will not be carelessly rotated by improperly applying the force on the wheel. Secondly, since the wheel module has sufficient number of switch elements, the functions of operating the wheel module are more diverse.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wheel module for an input device, said wheel module comprising: a circuit board, wherein at least one switch element is installed on said circuit board; a wheel swinging member disposed over said circuit board, so that said at least one switch element is arranged between said circuit board and said wheel swinging member; a wheel disposed on said wheel swinging member and rotatable relative to said wheel swinging member, wherein said wheel has a vacant structure, and a plurality of indentations are formed in an inner surface of said vacant structure; and a stopping arm comprising a contacting part and a poking part, wherein when said poking part is moved to allow said contacting part to be accommodated within one of said indentations, said wheel is non-rotatable, wherein by titling said wheel in a specified direction, said wheel swinging member is swung relative to said circuit board to trigger said at least one switch element, wherein said at least one switch element comprises a first switch element, a second switch element, a third switch element and a fourth switch element, which are respectively located at a front side, a rear side, a left side and a right side of said circuit board, wherein a first triggering part, a second triggering part, a third triggering part and a fourth triggering part are disposed on a bottom surface of said wheel swinging member at positions corresponding to said first switch element, said second switch element, said third switch element and said fourth switch element, respectively.

2. The wheel module according to claim 1 further comprising at least one elastic member, which is arranged between said wheel swinging member and said circuit board for providing an elastic force to said wheel swinging member.

3. The wheel module according to claim 2 wherein said elastic member is made of a rubbery material.

4. The wheel module according to claim 1 wherein said at least one switch element is a resistive pressure sensor or a capacitive pressure sensor.

5. The wheel module according to claim 1 wherein said input device has a casing, and an adjusting hole is located at a bottom surface of said casing, wherein an end of said poking part is penetrated through said adjusting hole, so that said end of said poking part is exposed outside said casing.

6. The wheel module according to claim 5 wherein an opening is formed in a top surface of said casing, wherein said wheel is partially exposed outside said casing through said opening.

7. The wheel module according to claim 5 wherein said stopping arm further comprises a linking part, which is arranged between said contacting part and said poking part, wherein as said poking part is moved, said contacting part is synchronously moved with said poking part through said linking part.

8. The wheel module according to claim 7 wherein when said poking part is moved to a specified position of said adjusting hole, said wheel is non-rotatable.

9. The wheel module according to claim 1 wherein said vacant structure is a hollow groove or a recess.

10. The wheel module according to claim 1 wherein said input device is a mouse device, a keyboard device or a mobile communication device.

* * * * *